April 6, 1948.  S. HENDRICKSON  2,439,340
WHEEL CONSTRUCTION
Filed April 28, 1944  2 Sheets-Sheet 1
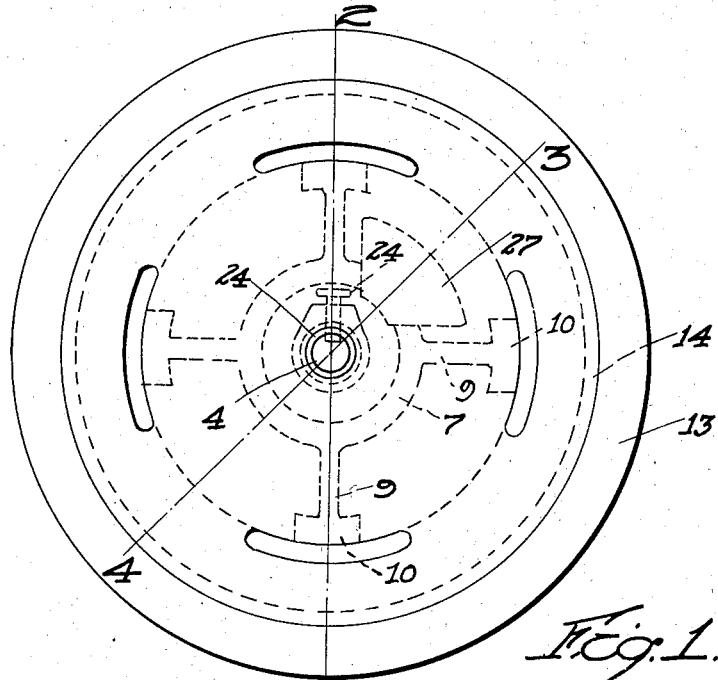
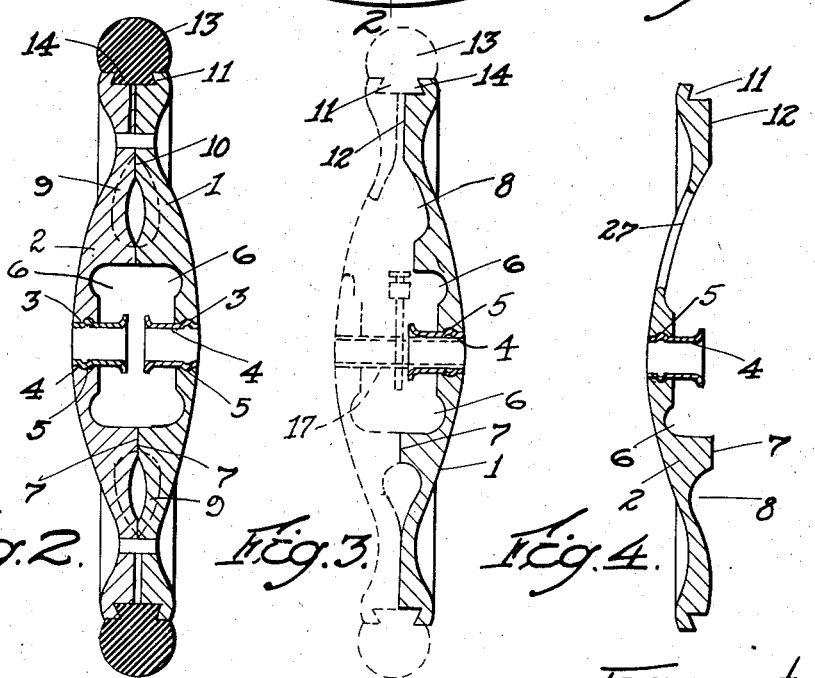
Inventor:
Severine Hendrickson
By Owen W. Kennedy
attorney April 6, 1948.    S. HENDRICKSON    2,439,340
WHEEL CONSTRUCTION
Filed April 28, 1944    2 Sheets-Sheet 2
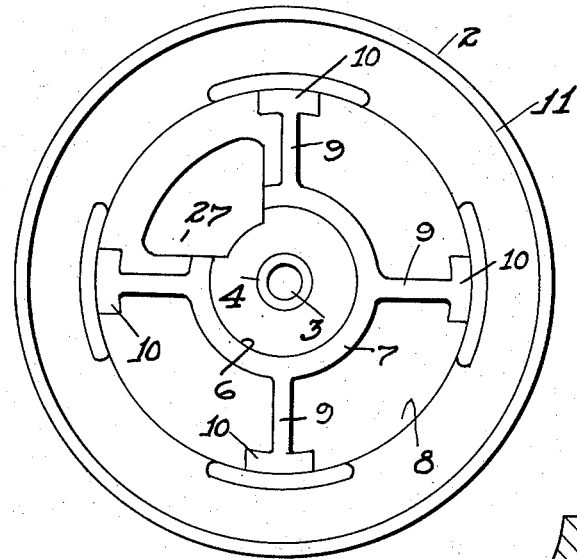
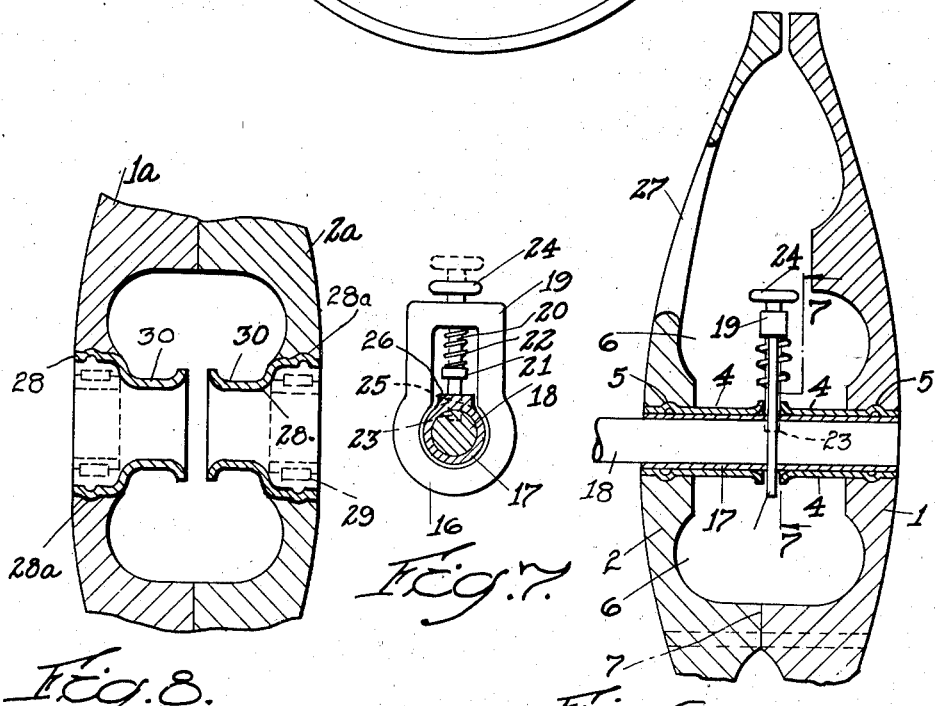
Inventor:
Severine Hendrickson
By Owen N. Kennedy
Attorney Patented Apr. 6, 1948

2,439,340

UNITED STATES PATENT OFFICE 2,439,340

WHEEL CONSTRUCTION

Severine Hendrickson, Templeton, Mass., assignor to Heywood-Wakefield Company, Gardner, Mass., a corporation of Massachusetts Application April 28, 1944, Serial No. 533,151

3 Claims. (Cl. 301—121)

The present invention relates to an improved wheel construction and has for its object to provide a wheel that is particularly adapted for use in connection with relatively small vehicles, such as baby carriages, children's wagons, and the like.

The wheel construction of the present invention is particularly characterized by the fact that the body of the wheel comprises complementary half-portions molded from heat plasticizable material, thereby reducing the use of metal in the wheel construction to a minimum, while providing a strong, light-weight wheel assembly of finished appearance. The improved wheel construction also provides a locking device for holding the wheel on a supporting axle, as well as an arrangement for securely mounting a molded one-piece tire in position when the complementary wheel portions are assembled. The above and other advantageous features of the invention will hereinafter more fully appear from the following description, considered in connection with the accompanying drawings, in which—

Fig. 1 is a view in side elevation of a wheel embodying the present invention.

Fig. 2 is a vertical sectional view along the line 2—2 of Fig. 1.

Figs. 3 and 4 are sectional views illustrating the appearance of the complementary wheel portions before their assembly, with the sections being taken along the line 3—4 of Fig. 1.

Fig. 5 is a view in side elevation of the wheel portion shown in Fig. 4, as viewed from the right.

Fig. 6 is a fragmentary sectional view on an enlarged scale, showing details of the wheel locking device, in cooperation with an associated vehicle axle.

Fig. 7 is a vertical sectional view along the line 7—7 of Fig. 6, looking in the direction of the arrows.

Fig. 8 is a fragmentary sectional view, illustrating a modification in the wheel bearing structure.

Referring first to Figs. 1 and 2, the wheel is shown as consisting of complementary half portions 1 and 2, with each half portion being formed separately from suitable heat plasticizable material by means of an injection molding machine, cooperating with molding dies, or by other methods. Each half portion 1 or 2 is circular in form and provides a central opening 3 in which is received a cylindrical bearing sleeve 4, that is preferably positioned as an insert in the molding die, so that the plasticized material is molded directly around one end of the sleeve 4.

It is to be noted that each sleeve 4 provides a shoulder 5, so that the sleeve will be firmly locked in position by embedding of the shoulder within the surrounding plastic material when the material hardens.

As best shown in Figs. 3, 4 and 5, each half-portion provides a recess 6 surrounding the sleeve 4, for a purpose which will later appear, and each recess 6 is in turn surrounded by an annular face 7 extending beyond the end of the sleeve 4. Each half-portion is recessed beyond the face 7, as indicated at 8, and a number of ribs 9 extend radially of the recess 8 and terminate in lugs 10 having flat faces lying in the same plane as the annular face 7. The periphery of each half-portion provides a groove 11 and a surface 12 extending inwardly from the groove 11 is offset from the comon plane, in which lie the face 7 and lugs 10. One side of each groove 11 is inclined with respect to the surface 12, so that when the half-portions 1 and 2 are assembled, as shown in Fig. 2, the two grooves 11 define between them a dove-tailed shaped space extending around the periphery of the wheel.

As previously pointed out, the wheel construction contemplates an arrangement for conveniently mounting a tire in position and to this end the wheel provides a tire 13, which is molded as a single piece from rubber, or suitable synthetic material having the desired resilient properties. The inside of the tire 13 is formed with a projection 14 which is dove-tailed in cross section so as to correspond to the shape of the space between the opposed grooves 11 on the half-portions 1 and 2. In order to mount the tire 13 on the wheel, it is only necessary to fit one side of the projection 14 into the groove 11 on one half-portion, as shown in dotted lines in Fig. 3, so that when the two half-portions are brought together with their faces 7 and lugs 10 in abutting relation, the tire 13 will be secured locked in position by reason of the interfitting relation between the grooves 11 and the dove-tailed tire projection 14.

When the half-portions 1 and 2 are assembled, as shown in Fig. 2, it will be noted that the opposed ends of the inwardly projecting bearing sleeves 4 are spaced apart, the object of this spacing being to permit the mounting of a locking device for securing the wheel on the axle of an associated vehicle. In Figs. 6 and 7 the construction of this locking device is shown on an enlarged scale, with only the adjacent parts of the half-portions being included.

As best shown in Fig. 7, the locking device consists of a housing disposed between the ends of the bearing sleeves 4 and providing a semi-circular portion 16 closely fitting an inner sleeve 17 extending through the sleeves 4 that are provided by the half-portions 1 and 2. The inner sleeve 17 fits closely around an axle 18 which is fixed to the body of the associated vehicle, so that the sleeve 17 provides a bearing on which the outside sleeves 4 rotate with the wheel assembly. The housing extends above the axle 18 and provides a U-shaped portion 19, in which a locking pin 20 is slidably mounted. The pin 20 provides a projection 21 and a spring 22 surrounding the pin between the projection 21 and the top of the housing yieldingly urges the end of the pin in the direction of the axle 18.

The axle 18 provides a notch 23 for receiving the lower end of the pin 20, so that with the pin received in the notch 23 the wheel assembly will be held against lateral movement on the axle. The upper end of the pin 20 provides a head 24 which may be seized in order to raise the pin out of engagement with the axle notch 23. When the pin 20 is so raised, as indicated in dotted lines in Fig. 7, the lower end of the pin will still be received within a slot 25 provided in a projection 26 formed on the inner sleeve 17 between the arms of the housing. With the retracted pin so engaged, turning of the pin housing on the sleeve 17 is prevented, and at the same time the sleeve 17 is held against end-wise movement with respect to the outer sleeves 4.

In order to give access to the head 24 by means of which the pin 20 can be operated, the wheel half-portion 2 provides an opening 27 leading into the recess 6, within which the locking device is located. It is evident from a consideration of Fig. 5 that this opening 27 is of sufficient size to permit the head 24 to be reached by the fingers upon turning the wheel with respect to the fixed axle 18 until the opening 27 is substantially opposite to the head.

Referring now to Figs. 2, 3 and 4, the assembly of the wheel is illustrated. As previously described, the tire 13 is molded in one piece and the first step of assembly consists in placing the tire in positon on the half-portion 1, with its dove-tailed shaped projection 14 seated in the groove 11, as indicated in dotted lines in Fig. 3.

Before assembling the other half-portion 2, the sleeve 17, carrying the locking pin assembly, is inserted within the sleeve 4 of the half-portion 1. This step is indicated in dotted lines in Fig. 3, and it is evident that the wheel assembly can then be completed by registering the sleeve 4 of the half-portion 2 with the sleeve 17 and bringing the half-portions together with their annular faces 7 and the lugs 10 in engagement, as shown in Fig. 2. This final act of assembly completes locking of the tire 13 in position, by reason of the inclusion of the dove-tailed shaped tire projection 14 between the opposed grooves 11 on the wheel portions.

The assembled half-portions 1 and 2 may then be permanently joined together by the application of a cement or suitable solvent to the faces 7 and lugs 10, or by the application of heat and pressure. For example, many thermoplastic materials will re-plasticize upon the application of heat to form a secure bond under pressure, while materials of the cellulose acetate group can be joined together by the use of a natural solvent, such as acetone. Obviously, the half-portions can also be joined by rivets extending transversely to the annular faces 7, as indicated in dotted lines in Fig. 6.

With the wheel assembly completed, it is obvious from a consideration of Fig. 6 that the wheel can be readily attached to the fixed axle 18 of a vehicle, such as a baby carriage or wagon. By turning the wheel until the opening 27 is substantially opposite to the pin assembly, the operating head 24 can be readily seized between the fingers and lifted to the dotted line position. The end of the axle 18 may then be inserted within the sleeve 17 and when the end of the axle is substantially flush with the end of the sleeve 17, release of the pin 20 will permit its lower end to be received in the locking notch 23 provided on the axle 18. Should it be desired to remove the wheel, the operating head 24 of the pin can be reached by turning the wheel on the axle until the opening 27 gives access to the head 24.

Referring now to Fig. 8, there is shown a modification of the wheel bearing construction, wherein the half-portions 1a and 2a each provide a bearing sleeve 28 that is adapted to receive a ball or roller bearing assembly 29, as indicated in dotted lines. It is to be noted that each sleeve 28 provides a shoulder 28a adapted to be embedded in the material of the half-portion, when the latter is molded. Each sleeve 28 also provides a cylindrical portion 30 of reduced diameter, which surrounds the axle and provides a shoulder, against which the bearing 29 is positioned.

From the foregoing, it is apparent that by the present invention there is provided an improved wheel construction, characterized by the provision of two separately molded half-portions, the assembly of which serves to lock a one-piece tire in position. Furthermore, each half-portion provides a bearing sleeve forming an integral part of the wheel by being molded as an insert, with the ends of the bearing sleeves being spaced apart in the assembly to permit the mounting of a locking device cooperating with the associated vehicle axle.

I claim:

1. A wheel construction comprising half-portions assembled in complemental relation to form a complete wheel, with said half-portions providing centrally located alined bearing sleeves extending into registering recesses provided by said portions, a third sleeve extending within said first-named sleeves for receiving a supporting axle, and a locking device mounted on said third sleeve, within said recesses, for securing the wheel on said axle.

2. A wheel construction comprising half-portions assembled in complemental relation to form a complete wheel, with said half-portions providing centrally located alined bearing sleeves extending into registering recesses provided by said portions, a third sleeve extending within said first-named sleeves for receiving a supporting axle, and a locking device mounted on said third sleeve within said recesses for securing the wheel on said axle, with one of said half-portions providing an opening communicating with said recesses to give access to said locking device.

3. A wheel construction comprising complemental half-portions of disk form, each formed separately from non-metallic moldable material, with each half-portion having a metallic bearing sleeve incorporated therein at the time of molding, said sleeve being of less length than the thickness of its half-portion, and with said half-portions providing flat surface lying in a common plane for face-to-face engagement with each other when said half-portions are assembled to form a complete wheel, with said bearing sleeves in axial alinement and spaced apart at their ends.

SEVERINE HENDRICKSON.

REFERENCES CITED

The following references are of record in the file of this patent:

UNITED STATES PATENTS

| Number | Name | Date |
|---|---|---|
| 1,408,825 | Palmer | Mar. 7, 1922 |
| 1,561,766 | Atwood | Nov. 17, 1925 |
| 1,895,093 | Carlson | Jan. 24, 1933 |
| 2,016,435 | Isidin | Oct. 8, 1935 |
| 2,089,986 | Schmidt | Aug. 17, 1937 |

FOREIGN PATENTS

| Number | Country | Date |
|---|---|---|
| 698,094 | France | Jan. 27, 1931 |
| 853,447 | France | May 14, 1907 |